United States Patent
Kwon et al.

(10) Patent No.: US 8,121,044 B2
(45) Date of Patent: Feb. 21, 2012

(54) METHOD AND APPARATUS FOR CDMA CONTROL SEGMENT HOPPING IN A MOBILE COMMUNICATION SYSTEM

(75) Inventors: Hwan-Joon Kwon, Suwon-si (KR); Dong-Hee Kim, Yongin-si (KR); Jae-Chon Yu, Suwon-si (KR); Jin-Kyu Han, Seoul (KR); Seung-Kyun Oh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 978 days.

(21) Appl. No.: 11/924,361

(22) Filed: Oct. 25, 2007

(65) Prior Publication Data

US 2008/0107087 A1    May 8, 2008

(30) Foreign Application Priority Data

Oct. 25, 2006   (KR) .................. 10-2006-0104235

(51) Int. Cl.
*H04B 7/216* (2006.01)
*H04J 1/00* (2006.01)

(52) U.S. Cl. ......... 370/252; 370/335; 370/343; 370/441

(58) Field of Classification Search .................. 370/208, 370/252, 254, 310, 338, 342, 343, 441, 468, 370/479–487, 335, 38; 455/452.2, 69, 522, 455/464, 63.1
See application file for complete search history.

(56) References Cited

U.S. PATENT DOCUMENTS

| | | | |
|---|---|---|---|
| 6,434,184 B2 * | 8/2002 | Lindsey | 375/135 |
| 7,042,857 B2 * | 5/2006 | Krishnan et al. | 370/329 |
| 7,349,457 B2 * | 3/2008 | Stoddard et al. | 375/131 |
| 7,634,239 B2 * | 12/2009 | Stoddard et al. | 455/115.2 |
| 2005/0181799 A1 | 8/2005 | Laroia et al. | |
| 2005/0215208 A1 * | 9/2005 | Stoddard et al. | 455/115.2 |
| 2005/0227626 A1 * | 10/2005 | Stoddard et al. | 455/67.11 |
| 2006/0172716 A1 * | 8/2006 | Yoshii et al. | 455/226.1 |
| 2007/0201398 A1 * | 8/2007 | Yang et al. | 370/329 |
| 2008/0014951 A1 * | 1/2008 | Laroia et al. | 455/450 |
| 2008/0130559 A1 * | 6/2008 | Pi | 370/329 |

FOREIGN PATENT DOCUMENTS

| | | |
|---|---|---|
| KR | 1020060068482 | 6/2006 |
| KR | 1020060089507 | 8/2006 |

\* cited by examiner

*Primary Examiner* — Seema S Rao
*Assistant Examiner* — Mon Cheri Davenport
(74) *Attorney, Agent, or Firm* — The Farrell Law Firm, P.C.

(57) ABSTRACT

A method and apparatus for hopping of a Code Division Multiple Access (CDMA) control segment that carries control information in an Orthogonal Frequency Division Multiple Access (OFDMA) packet data mobile communication system are provided, in which a number of CDMA control segment hopping zones, each CDMA control segment hopping zone representing a frequency area for CDMA control segment hopping, is determined according to a total number of available tiles in the system and a number of tiles per CDMA control segment, each tile including a predetermined number of subcarriers, or according to a total number of available subcarriers in the system and a number of subcarriers per CDMA control segment. Start points of the hopping zones are determined using the number of the hopping zones, and the control information is transmitted or received in the CDMA control segment through hopping of the CDMA control segment over the hopping zones using the start points.

14 Claims, 6 Drawing Sheets

METHOD AND APPARATUS FOR CDMA CONTROL SEGMENT HOPPING IN A MOBILE COMMUNICATION SYSTEM

PRIORITY

This application claims priority under 35 U.S.C. §119(a) to a Korean Patent Application filed in the Korean Intellectual Property Office on Oct. 25, 2006 and assigned Serial No. 2006-104235, the entire disclosure of which is hereby incorporated by reference.

BACKGROUND OF THE INVENTION

1. Field of the Invention

The present invention generally relates to a method and apparatus for transmitting uplink control information in a mobile communication system. More particularly, the present invention relates to a method and apparatus for hopping of a Code Division Multiple Access (CDMA) segment carrying control information in CDMA in an Orthogonal Frequency Division Access (OFDMA) packet data mobile communication system.

2. Description of the Related Art

FIG. 1 is a block diagram of a transmitter 100 for transmitting control information 102 in a conventional OFDMA uplink system. The control information can be a Channel Quality Indicator (CQI), an access probe, or a Multiple-Input Multiple-Output (MIMO) beamforming index.

Referring to FIG. 1, a Walsh code mapper 104 maps the control information 102 to a predetermined Walsh code and a chip repeater 106 repeats the chips of the mapped control information. After I/Q mapping in an I/Q mapper 108, a scrambler 110 scrambles the I/Q-mapped control information. An output A 112 is the result from processing the uplink control information 102 in the components 104 to 110. The output A 112 is transmitted in a method described in FIG. 2.

FIG. 2 illustrates a conventional method for transmitting the output A 112 illustrated in FIG. 1 on a physical channel. That is, after Walsh code mapping, chip repetition, I/Q mapping, and scrambling, the output A 112 is transmitted in the method illustrated in FIG. 2.

Referring to FIG. 2, the vertical axis represents frequency and the horizontal axis represents time. Each smaller rectangle 200 represents a tile. In general, one tile is defined by 16 successive subcarriers and 8 successive OFDMA symbols. The tile definition varies according to system configuration. For example, if a system has 480 available subcarriers, there are 30 tiles, each tile having 16 subcarriers (480=30×16).

The total frequency band of the system is usually divided into a plurality of subbands, as illustrated in FIG. 2. The subbands are used for frequency selective scheduling or other purposes. In FIG. 2, 6 subbands, Subband 0 to Subband 5 exist. Each larger square 202 represents a CDMA control segment. The CDMA control segment includes a plurality of tiles and a plurality of OFDM symbols. The square 202 is called a CDMA segment because the output A 112 is mapped to the square 202, for transmission. The CDMA control segment 202 frequency hops over time as illustrated in FIG. 2 to achieve maximum channel and interference diversity. The CDMA control segment 202 hops on a subband basis. This hopping rule is preferable when the size of the CDMA control segment 202 is equal to that of a subband.

FIG. 3 illustrates a phenomenon that appears when a CDMA control segment hops on a subband basis, in the case where the CDMA control segment differs from a subband in size.

Referring to FIG. 3, it is noted that CDMA control segments are overlapped with one another over a large area along the frequency axis, which is not preferred in terms of maximization of channel and interference diversity. In general, the CDMA control segment size is determined by the size of the control information 102 and the subband size is determined by a frequency selective scheduling gain. Therefore, the CDMA control segment size is different from the subband size.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide an apparatus and method for setting an efficient CDMA control segment hopping rule and transmitting/receiving control information according to the CDMA control segment hopping rule, if a CDMA control segment size is different from a subband size in transmitting uplink control information in CDMA in an OFDMA system.

In accordance with an aspect of exemplary embodiments of the present invention, there is provided a method for CDMA control segment hopping, wherein the control segment carries control information in an OFDMA packet data mobile communication system, in which the number of CDMA control segment hopping zones, each CDMA control segment hopping zone representing a frequency area for CDMA control segment hopping is determined according to a total number of available tiles in the system and a number of tiles per CDMA control segment, each tile including a predetermined number of subcarriers, or according to a total number of available subcarriers in the system and a number of subcarriers per CDMA control segment, start points of the CDMA control segment hopping zones are determined using a number of the CDMA control segment hopping zones, and the control information is transmitted or received in the CDMA control segment through CDMA control segment hopping over the CDMA control segment hopping zones using the start points.

In accordance with another aspect of exemplary embodiments of the present invention, there is provided an apparatus for CDMA control segment hopping, wherein the control segment carries control information in an OFDMA packet data mobile communication system, in which a hopping zone decider determines the number of CDMA control segment hopping zones, each CDMA control segment hopping zone representing a frequency area for CDMA control segment hopping, according to a total number of available tiles in the system and a number of tiles per CDMA control segment, each tile including a predetermined number of subcarriers, or according to a total number of available subcarriers in the system and a number of subcarriers per CDMA control segment, and determines start points of the CDMA control segment hopping zones using a number of the CDMA control segment hopping zones, and a device transmits or receives the control information in the CDMA control segment through CDMA control segment hopping over the CDMA control segment hopping zones using the start points.

In accordance with a further aspect of exemplary embodiments of the present invention, there is provided a method for CDMA control segment hopping, wherein the CDMA control segment carries control information in an OFDMA packet data mobile communication system, in which a start point corresponding to each hopping time is read from a memory that pre-stores start points of CDMA control segment hopping zones, the start points of CDMA control segment hopping zones being determined according to a total number of available subcarriers in the system and a number of subcarriers per CDMA control segment, and the control information is transmitted or received in a CDMA control segment hopping zone corresponding to the read start point.

In accordance with still another aspect of exemplary embodiments of the present invention, there is provided an apparatus for CDMA control segment hopping, wherein the CDMA control segment carries control information in an OFDMA packet data mobile communication system, in which a memory stores start points of CDMA control segment hopping zones, the start points of CDMA control segment hopping zones being determined according to a total number of available subcarriers in the system and a number of subcarriers per CDMA control segment, a hopping zone decider reads a start point corresponding to a hopping time from among the stored start points of the memory, and a device transmits or receives the control information in a CDMA control segment hopping zone corresponding to the read start point.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

Figure 1:
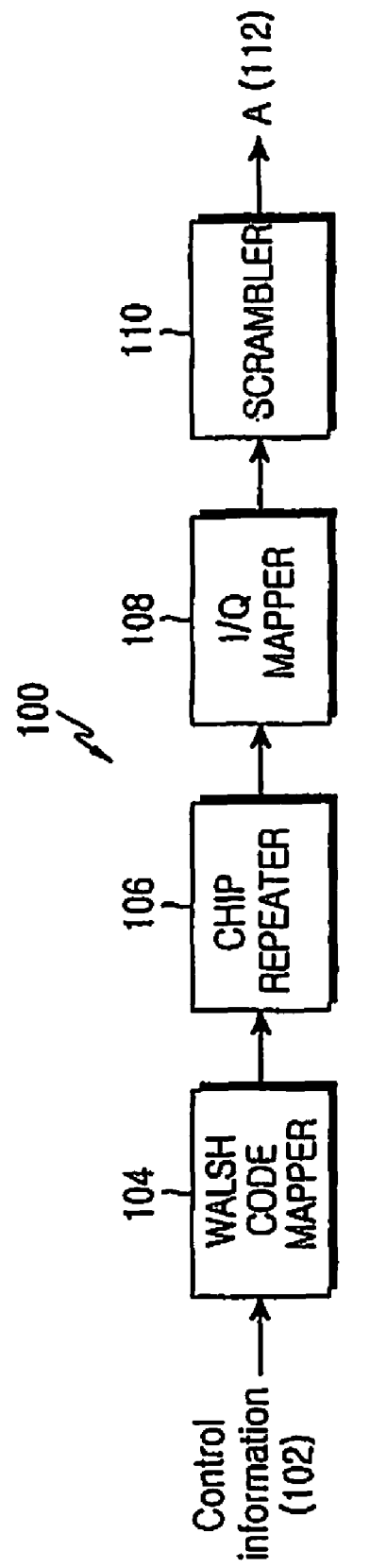
FIG. 1 is a block diagram of a transmitter for transmitting control information 102 in a conventional OFDMA uplink system.
Figure 2:
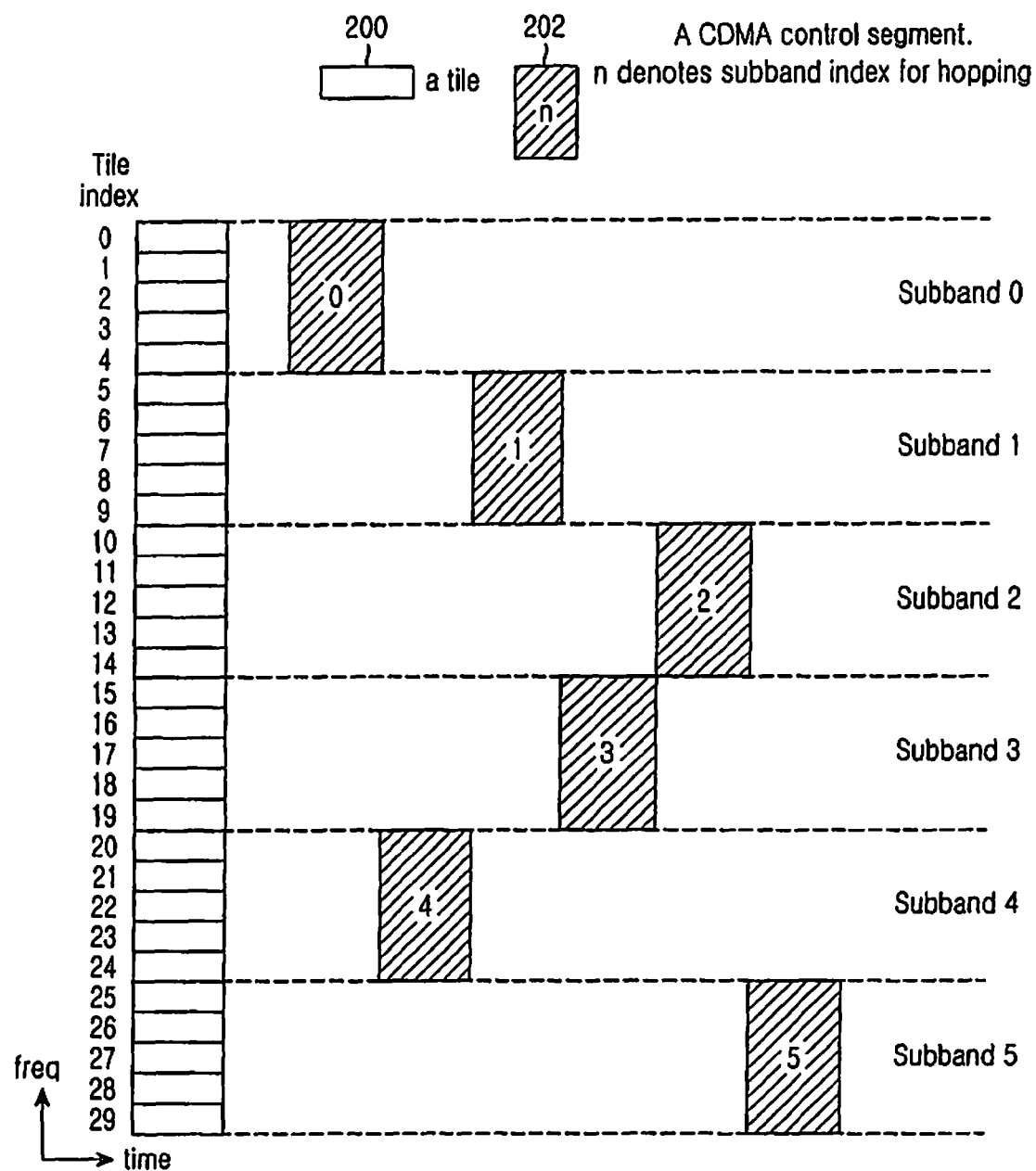
FIG. 2 illustrates a conventional method for transmitting the control information illustrated in FIG. 1 on a physical channel.
Figure 3:
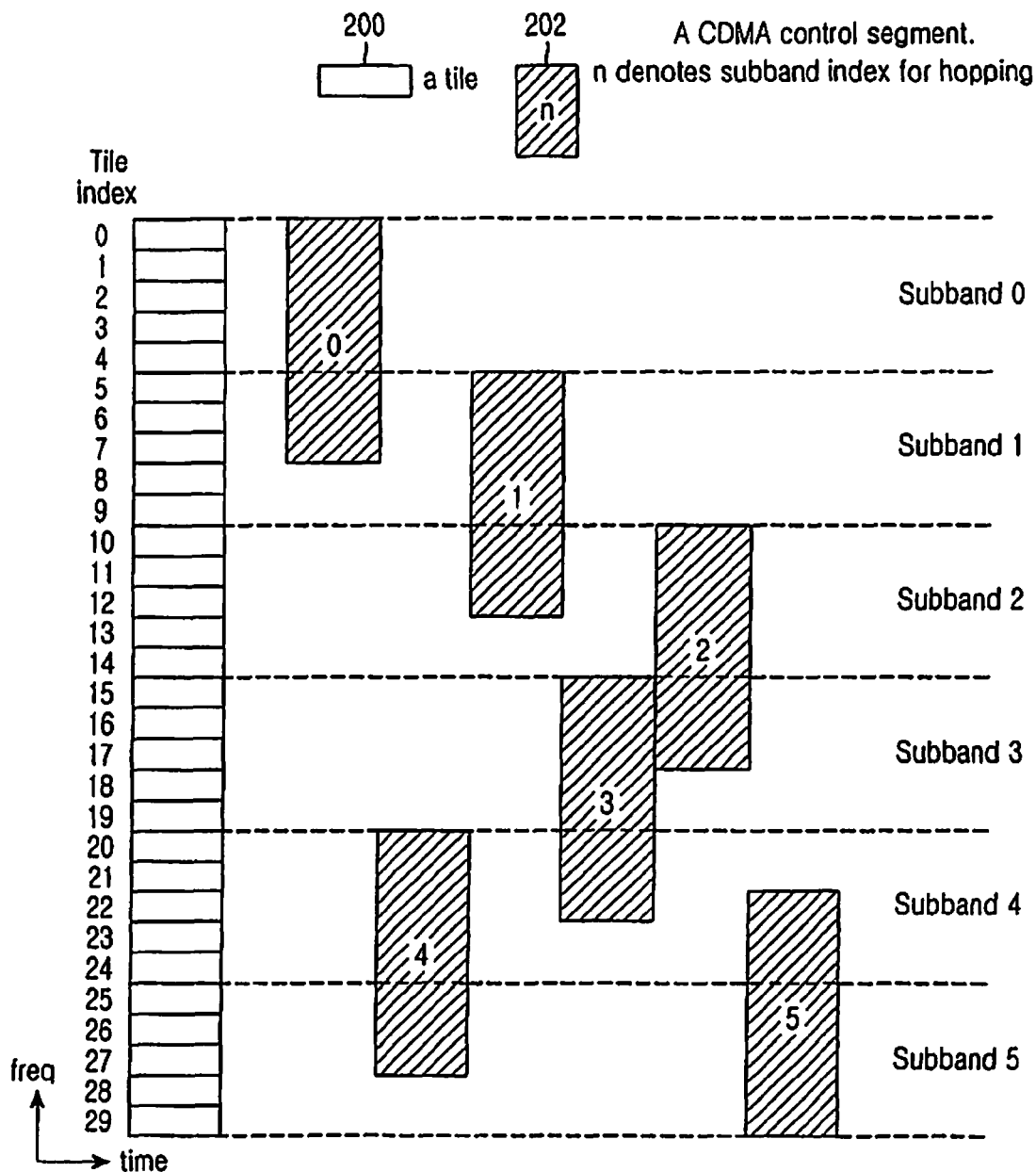
FIG. 3 illustrates a phenomenon that appears when a CDMA control segment hops on a subband basis, in the case where the CDMA control segment differs from a subband in size.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The features of the present invention are summarized as follows.

An exemplary embodiment of the present invention provides a CDMA control segment hopping rule that is specified as follows.

(1) The number of CDMA control segment hopping zones is determined according to the total number of tiles available to the system and a CDMA control segment size (i.e. the number of tiles per CDMA control segment).

(2) The start point of each hopping zone is determined on a tile basis using the number of the hopping zones according to a predetermined rule. If the end of a hopping zone including the last tile is outside the total system frequency band, as many tiles of the hopping zone as outside the total system frequency band are pushed inward so that the hopping zone falls into the system frequency band.

(3) One of the start points of the CDMA control segment zones is selected using a PN sequence at each hopping time, for frequency hopping of a CDMA control segment to which control information is mapped.

Another exemplary embodiment of the present invention provides a CDMA control segment hopping rule that is specified as follows.

(1) The start positions of hopping zones are calculated according to the total number of available subcarriers in the system and the total number of subcarriers per CDMA control segment. These start positions are stored beforehand in a memory. Then, a start point corresponding to a hopping time is read from the memory.

(2) Control information is carried in the hopping zone that starts at the read start point.

Equation (1a) and Equation (1b) describe the afore-stated rule of determining the number CDMA control segment hopping zones.

$$\left\lceil \frac{\text{number of tiles in entire } BW}{\text{number of tiles in a } CDMA \text{ segment}} \right\rceil \quad (1a)$$

where number of tiles in entire BW denotes the total number of tiles that can be defined with a total bandwidth (i.e. the total number of tiles available for transmission of control information in the OFDM system) and number of tiles in a CDMA segment denotes the number of tiles per CDMA segment. ⌈x⌉ represents the minimum integer greater than or equal to x.

$$\left\lceil \frac{\text{number of useful subcarriers in entire } BW}{\text{number of subcarriers in a } CDMA \text{ segment}} \right\rceil \quad (1b)$$

where number of useful subcarriers in entire BW denotes the total number of subcarriers that can be defined with the total bandwidth (i.e. the total number of subcarriers available for transmission of control information in the OFDM system) and number of subcarriers in a CDMA segment denotes the number of subcarriers per CDMA segment. ⌈x⌉ represents the minimum integer greater than or equal to x.

With the number of CDMA control segment hopping zones computed by Equation (1a), the start of each hopping zone is determined as follows.

$$\left\lfloor \frac{\text{number of tiles in entire } BW}{\text{number of hopping zones}} \cdot k \right\rfloor, \quad (2)$$

$$k = 0, \ldots, \text{number of hopping zones} - 1$$

where number of tiles in entire BW denotes the total number of tiles that can be defined with a total bandwidth (i.e. the total number of tiles available for transmission of control information in the OFDM system) and number of hopping zones denotes the number of CDMA control segment hopping zones. ⌊x⌋ represents the maximum integer less than or equal to x. The start of a hopping zone computed by Equation (2) is a tile index. If Equation (2) results '3', the hopping zone starts from tile 3.

An example for the CDMA control segment hopping rule based on Equation (1a) and Equation (2) will now be given. If number of tiles in entire BW is 30 and number of tiles in a CDMA segment is 8, the number of CDMA control segment hopping zones is 4 according to Equation (1a). If Equation (1b) is computed instead of Equation (1a), the number of subcarriers substitutes for the number of tiles.

According to Equation (2), the start points of the CDMA control segment hopping zones are given as tile indexes 0, 7, 15, and 22. Thereafter, at each hopping time, one of the four start points is selected by a predetermined randomization method, for example, by use of a predetermined PN sequence and control information is transmitted by CDMA control segment hopping in the CDMA control segment hopping zone with the selected start point.

Figure 4:
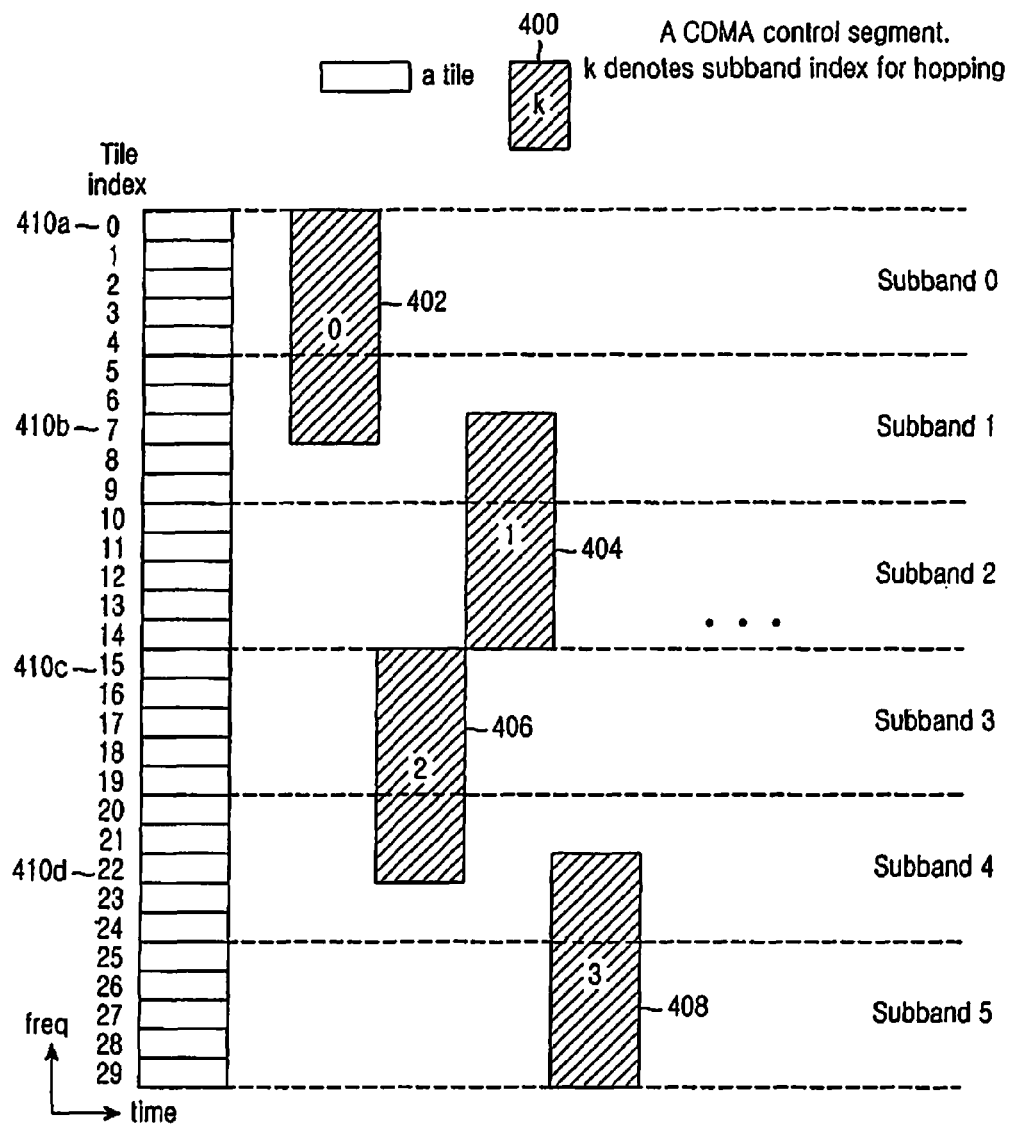
FIG. 4 illustrates a CDMA control segment hopping method according to an exemplary embodiment of the present invention.

FIG. 4 illustrates a CDMA control segment hopping method according to an exemplary embodiment of the present invention. In the illustrated case of FIG. 4, the total number of tiles in the system is 30 (tile index 0 to tile index 29) and 8 tiles are included in each CDMA control segment. Thus, the hopping zones start from tile indexes 0, 7, 15 and 22, respectively. It is noted from FIG. 4 that a CDMA control segment hops in the hopping zones based on the start points.

Referring to FIG. 4, for number of tiles in entire BW=30 and number of tiles in a CDMA segment=8, four CDMA control segment hopping zones are created according to Equation (1a). Computation of Equation (2) using the number of CDMA control segment hopping zones tells that their start points are tiles 410a to 410d (tile index 0, tile index 7, tile index 15, and tile index 22).

Considering one tile includes a plurality of subcarriers, it is obvious that Equation (1a) and Equation (2) are also computable by substituting subcarriers for tiles.

Figure 5:
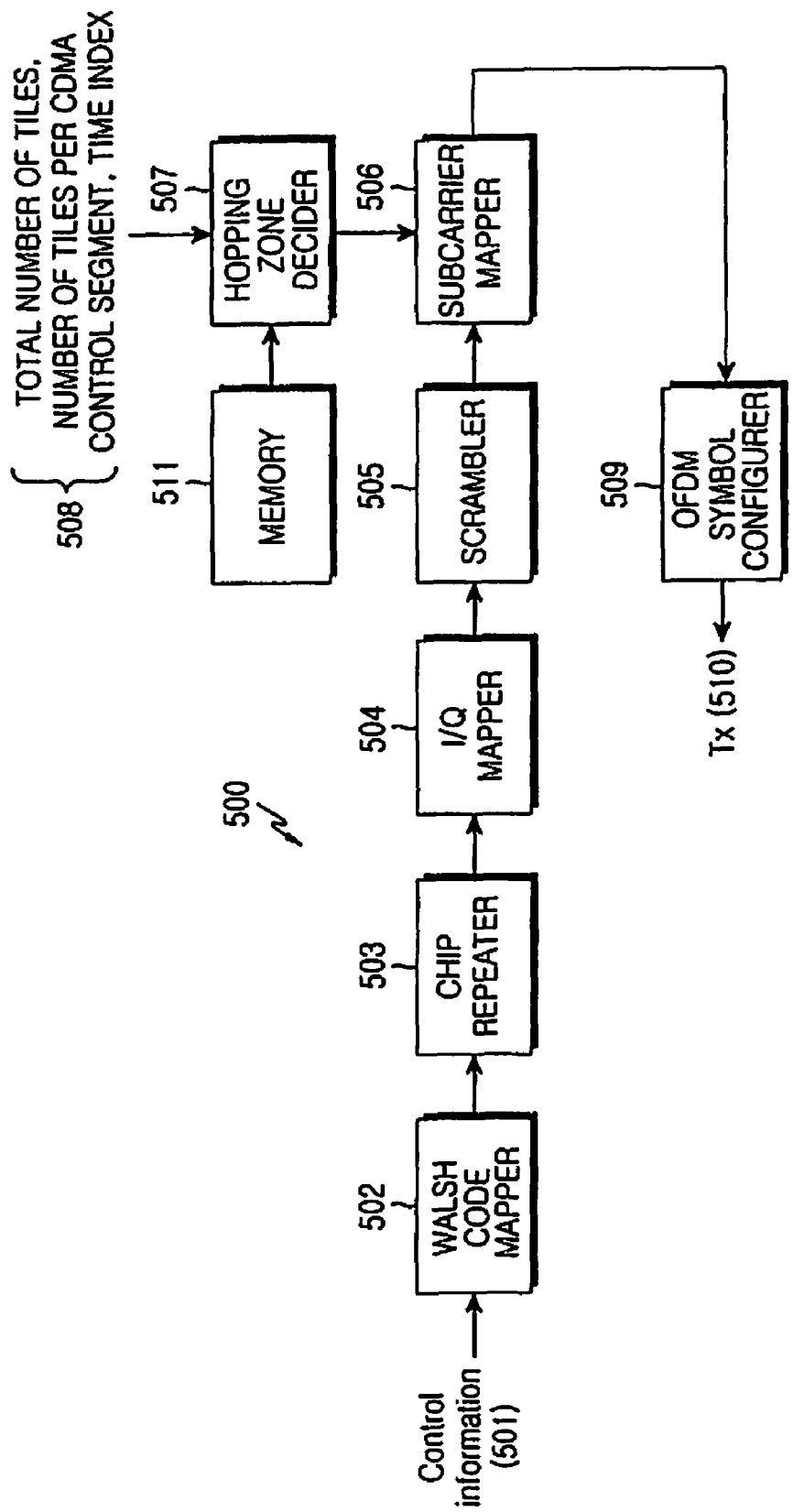
FIG. 5 is a block diagram of a Mobile Station (MS) transmitter for transmitting a CDMA control segment according to an exemplary embodiment of the present invention.

FIG. 5 is a block diagram of an MS transmitter 500 for transmitting a CDMA control segment according to an exemplary embodiment of the present invention.

Referring to FIG. 5, a Walsh code mapper 502 maps control information 501 to a Walsh code according to a predetermined mapping rule. A chip repeater 503 repeats the chips of the mapped control information in a predetermined method, an I/Q mapper 504 maps the chip-repeated control information to I and Q signals, and a scrambler 505 scrambles the I/Q-mapped signal.

The output of the scrambler 505 is mapped to a CDMA control segment 400 in FIG. 4 under the control of a hopping zone decider 507. The hopping zone decider 507 selects one of the start points of hopping zones computed using information 508 indicating the total number of available tiles, the number of tiles per CDMA control segment, and a time index corresponding to a hopping time for deciding a hopping sequence. This means that the hopping zone decider 507 selects one of the four start points according to the time index corresponding to the hopping time since each hopping occurs at one of the start points, time indexes 0, 7, 15 and 22. As stated before, the start points of the hopping zones can be computed on a subcarrier basis rather than on a tile basis. The hopping zone decider 507 can be incorporated into a controller (not shown).

Therefore, the CDMA control segment can be transmitted in a hopping zone corresponding to the selected start point.

That is, in accordance with an exemplary embodiment of the present invention, the hopping zone decider 507 determines the number of hopping zones each representing a frequency band in which a CDMA control segment hops, according to the total number of available tiles in the system and the number of tiles per CDMA segment. Then, the hopping zone decider 507 calculates the start points of the hopping zones based on the number of the hopping zones.

In accordance with another exemplary embodiment of the present invention, a memory 511 pre-stores the number of hopping zones each representing a frequency band in which a CDMA control segment hops, which is determined according to the total number of available subcarriers in the system and the number of subcarriers per CDMA segment. Then, the hopping zone decider 507 reads a start point corresponding to each hopping time from the memory according to a predetermined rule such as a hopping sequence. Then a subcarrier mapper 506 maps the control information to the subcarriers of a hopping zone corresponding to the read start point.

The selection of a start point from among the start points stored in the memory 511 can be considered in two ways.

One of the ways that a start point can be selected is that the hopping zone decider 507 reads the pre-stored start points from the memory 511 and selects one of the start points at each hopping time according to a predetermined rule and the subcarrier mapper 506 transmits control information according to the selected start point.

The other way is that the hopping zone decider 507 reads one start point corresponding to a current hopping time among the pre-stored start points from the memory 511 and the subcarrier mapper 506 transmits control information according to the read start point.

The output of the subcarrier mapper 506 is processed in an OFDM symbol configurer 509 by Fast Fourier Transform (FFT) and a Cyclic Prefix (CP) addition and then transmitted as Transmission (Tx) data 510.

In FIG. 5, a Walsh code mapper 502, a chip repeater 503, an I/Q mapper 504, a scrambler 505, a subcarrier mapper 506 and an OFDM symbol configurer 509 are called transmitting device.

Figure 6:
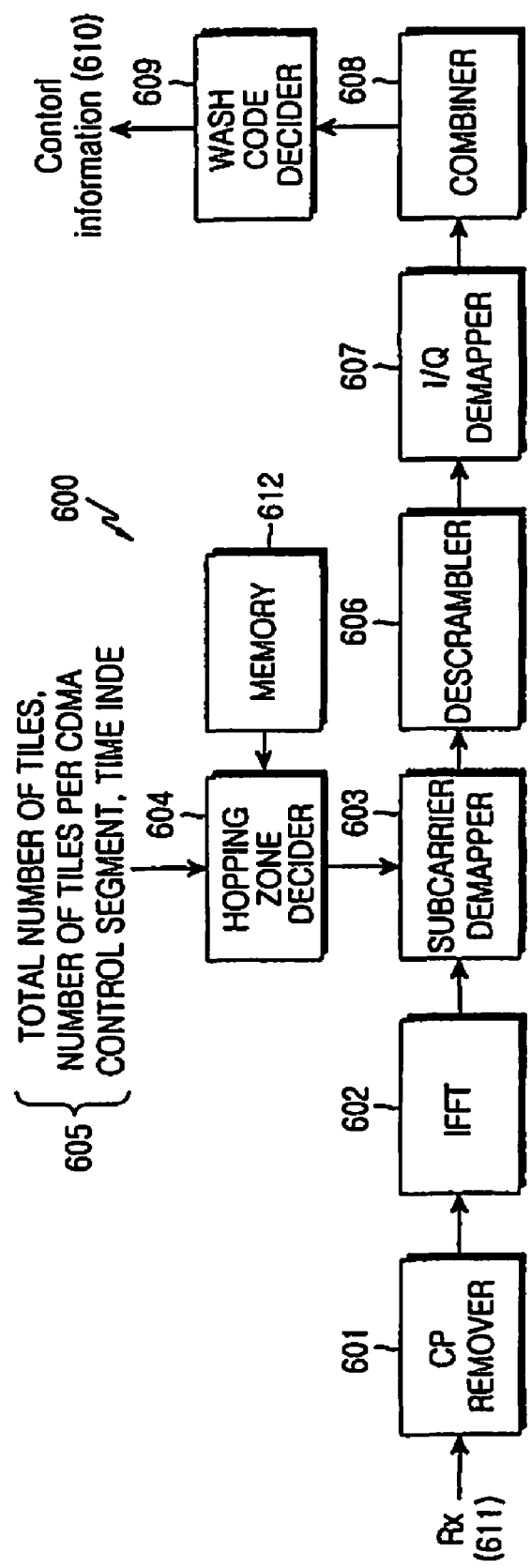
FIG. 6 is a block diagram of a Base Station (BS) receiver for receiving a CDMA control segment according to an exemplary embodiment of the present invention.

FIG. 6 is a block diagram of a BS receiver 600 for receiving a CDMA control segment according to an exemplary embodiment of the present invention.

Referring to FIG. 6, a CP remover 601 removes a CP from a Received (Rx) signal 611. An Inverse Fast Fourier Transform (IFFT) processor 602 converts the CP-free signal to a time signal. A subcarrier demapper 603 demaps subcarriers from the time signal in the reverse order of the subcarrier mapping in the subcarrier mapper 506 illustrated in FIG. 5 under the control of a hopping zone decider 604.

The hopping zone decider 604 functions to select one of the start points of hopping zones computed using information 605 indicating the total number of available tiles, the number of tiles per CDMA control segment, and a time index corresponding to a hopping time for deciding a hopping sequence. The information 605 is identical to the information 508 input to the transmitter 500 of FIG. 5. The same hopping rule as used in the transmitter 500 is applied in selecting the start point.

That is, in accordance with an exemplary embodiment of the present invention, the hopping zone decider 604 determines the number of hopping zones, each representing a frequency band in which a CDMA control segment hops, according to the total number of available tiles in the system and the number of tiles per CDMA segment. Then, the hopping zone decider 604 calculates the start points of the hopping zones based on the number of the hopping zones.

In accordance with another exemplary embodiment of the present invention, a memory 612 pre-stores the number of hopping zones each representing a frequency band in which a CDMA control segment hops, which is determined according to the total number of available subcarriers in the system and the number of subcarriers per CDMA segment. Then, the hopping zone decider 604 reads a start point corresponding to each hopping time from the memory according to a predetermined rule such as a hopping sequence. Then the subcarrier demapper 603 extracts the control information from the subcarriers of a hopping zone corresponding to the read start point.

The selection of a start point from among the start points stored in the memory 612 can be considered in two ways.

One of them is that the hopping zone decider 604 reads the pre-stored start points from the memory 612 and selects one of the start points at each hopping time according to a predetermined rule and the subcarrier demapper 603 extracts control information according to the selected start point.

The other way is that the hopping zone decider 604 reads one start point corresponding to a current hopping time among the pre-stored start points from the memory 612 and the subcarrier demapper 603 extracts control information according to the read start point.

The subcarrier demapper 603 outputs a frequency signal with as many tiles as included in a CDMA control segment, counted from the start point that the hopping zone decider 604 indicates. Therefore, the receiver 600 receives control information in a CDMA control segment transmitted in a CDMA control segment hopping zone corresponding to a predetermined frequency area.

The demapped signal from the subcarrier demapper 603 is descrambled in a predetermined method by a descrambler 606 and I/Q-demapped by an I/Q demapper 607. The I/Q demapped signal is combined as many times as chip repetitions performed in the chip repeater 503 of FIG. 5 by a combiner 608. The combined signal is provided to a Walsh code decider 609 and control information 610 is output according to decision of the Walsh code decider 609.

In FIG. 6, a CP remover 601, an IFFT 602, a subcarrier demapper 603, a descrambler 606, an I/Q demapper 607, a combiner 608 and a Walsh code decider 609 are called receiving device.

As is apparent from the above description, the present invention provides an efficient hopping rule for a CDMA control segment, when uplink control information is transmitted in CDMA with a CDMA control segment size different from a subband size in an uplink OFDMA system. Therefore, channel and interference diversity effects are maximized according to the hopping rule and thus uplink performance is significantly improved.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for Code Division Multiple Access (CDMA) control segment hopping, wherein the control segment carries control information in an Orthogonal Frequency Division Multiple Access (OFDMA) packet data mobile communication system, comprising:

determining a number of CDMA control segment hopping zones, each CDMA control segment hopping zone representing a frequency area for CDMA control segment hopping, according to a total number of available resources in the system and a number of resources per CDMA control segment, wherein each resource includes a predetermined number of subcarriers, or according to a total number of available subcarriers in the system and a number of subcarriers per CDMA control segment;

determining start points of the CDMA control segment hopping zones using the number of the CDMA control segment hopping zones; and transmitting or receiving the control information in the CDMA control segment through CDMA control segment hopping over the CDMA control segment hopping zones using the start points.

2. The method of claim 1, wherein the CDMA control segment hopping zones are defined according to the number and start points of the CDMA control segment hopping zones so as to minimize frequency overlapping among the CDMA control segment hopping zones.

3. The method of claim 1, wherein determining the number of CDMA control segment hopping zones comprises computing the number of CDMA control segment hopping zones by $$\left\lceil \frac{\text{number of tiles in entire } BW}{\text{number of tiles in a } CDMA \text{ segment}} \right\rceil$$

where number of tiles in entire BW denotes the total number of available resources in the system, number of tiles in a CDMA segment denotes the number of resources per CDMA segment, and $\lceil x \rceil$ represents a minimum integer greater than or equal to x.

4. The method of claim 1, wherein determining the number of CDMA control segment hopping zones comprises computing the number of CDMA control segment hopping zones by $$\left\lceil \frac{\text{number of useful subcarries in entire } BW}{\text{number of subcarriers in a } CDMA \text{ segment}} \right\rceil$$

where number of useful subcarriers in entire BW denotes the total number of subcarriers available in a BandWidth (BW) of the system, number of subcarriers in a CDMA segment denotes the number of subcarriers per CDMA segment, and $\lceil x \rceil$ represents a minimum integer greater than or equal to x.

5. The method of claim 3, wherein determining the start points of the CDMA control segment hopping zones comprises computing the start points of the CDMA control segment hopping zones by $$\left\lfloor \frac{\text{number of tiles in entire } BW}{\text{number of hopping zones}} \cdot k \right\rfloor,$$

$$k = 0, \ldots, \text{number of hopping zones} - 1$$

where number of tiles in entire BW denotes the total number of resources available in a BandWidth (BW) of the system, number of hopping zones denotes the number of CDMA control segment hopping zones, k denotes an index of a hopping zone with a computed start point, $\lfloor x \rfloor$ represents the maximum integer less than or equal to x, and the start point is a first resource index among resources of a kth hopping zone.

6. The method of claim 1, wherein the transmission or reception comprises:

selecting one of the start points using a predetermined Pseudo-Noise (PN) sequence or in a predetermined rule at each hopping time; and transmitting or receiving the control information in a hopping zone corresponding to the selected start point.

7. An apparatus for Code Division Multiple Access (CDMA) control segment hopping, wherein the control segment carries control information in an Orthogonal Frequency Division Multiple Access (OFDMA) packet data mobile communication system, comprising:

a hopping zone decider for determining a number of CDMA control segment hopping zones, each CDMA control segment hopping zone representing a frequency area for CDMA control segment hopping, according to a total number of available resources in the system and a number of resources per CDMA control segment, each resource including a predetermined number of subcarriers, or according to a total number of available subcarriers in the system and a number of subcarriers per CDMA control segment, and determining start points of the CDMA control segment hopping zones using the number of the CDMA control segment hopping zones; and a device for transmitting or receiving the control information in the CDMA control segment through CDMA control segment hopping over the CDMA control segment hopping zones using the start points.

8. The apparatus of claim 7, wherein the CDMA control segment hopping zones are defined according to the number of the CDMA control segment hopping zones and start points of the CDMA control segment hopping zones so as to minimize frequency overlapping among the CDMA control segment hopping zones.

9. The apparatus of claim 7, wherein the hopping zone decider computes the number of CDMA control segment hopping zones by $$\left\lceil \frac{\text{number of tiles in entire } BW}{\text{number of tiles in a } CDMA \text{ segment}} \right\rceil$$

where number of tiles in entire BW denotes the total number of available resources in a BandWidth (BW) of the system, number of tiles in a CDMA segment denotes the number of resources per CDMA segment, and $\lceil x \rceil$ represents a minimum integer greater than or equal to x.

10. The apparatus of claim 7, wherein the hopping zone decider computes the number of CDMA control segment hopping zones by $$\left\lceil \frac{\text{number of useful subcarries in entire } BW}{\text{number of subcarriers in a } CDMA \text{ segment}} \right\rceil$$

where number of useful subcarriers in entire BW denotes the total number of subcarriers available in a BandWidth (BW) of the system, number of subcarriers in a CDMA segment denotes the number of subcarriers per CDMA segment, and $\lceil x \rceil$ represents a minimum integer greater than or equal to x.

11. The apparatus of claim 9, wherein the hopping zone decider computes the start points of the CDMA control segment hopping zones by $$\left\lfloor \frac{\text{number of tiles in entire } BW}{\text{number of hopping zones}} \cdot k \right\rfloor,$$

$k = 0, \ldots,$ number of hopping zones $- 1$ where number of tiles in entire BW denotes the total number of resources available in the system, number of hopping zones denotes the number of CDMA control segment hopping zones, k denotes the index of a hopping zone with a computed start point, $\lfloor x \rfloor$ represents the maximum integer less than or equal to x, and the start point is a first resource index among resources of a kth hopping zone.

12. The apparatus of claim 7, wherein the hopping zone decider selects one of the start points using a predetermined Pseudo-Noise (PN) sequence or in a predetermined rule at each hopping time and notifies the device of the selected start point, and the device transmits or receives the control information in a hopping zone corresponding to the selected start point.

13. A method for Code Division Multiple Access (CDMA) control segment hopping, wherein the CDMA control segment carries control information in an Orthogonal Frequency Division Multiple Access (OFDMA) packet data mobile communication system, comprising:

reading a start point corresponding to each hopping time from a memory that pre-stores start points of CDMA control segment hopping zones, the start points of CDMA control segment hopping zones being determined according to a total number of available subcarriers in the system and a number of subcarriers per CDMA control segment; and transmitting or receiving the control information in a CDMA control segment hopping zone corresponding to the read start point.

14. An apparatus for Code Division Multiple Access (CDMA) control segment hopping, wherein the CDMA control segment carries control information in an Orthogonal Frequency Division Multiple Access (OFDMA) packet data mobile communication system, comprising:

a memory for storing start points of CDMA control segment hopping zones, the start points of CDMA control segment hopping zones being determined according to a total number of available subcarriers in the system and a number of subcarriers per CDMA control segment;

a hopping zone decider for reading a start point corresponding to a hopping time from among the stored start points of the memory; and a device for transmitting or receiving the control information in a CDMA control segment hopping zone corresponding to the read start point.

* * * * *